US008191105B2

(12) United States Patent
Adams et al.

(10) Patent No.: US 8,191,105 B2
(45) Date of Patent: May 29, 2012

(54) SYSTEM AND METHOD FOR HANDLING ELECTRONIC MESSAGES

(75) Inventors: Neil P. Adams, Waterloo (CA); David V. MacFarlane, Waterloo (CA); Ian Robertson, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1304 days.

(21) Appl. No.: 11/281,424

(22) Filed: Nov. 18, 2005

(65) Prior Publication Data

US 2007/0118874 A1   May 24, 2007

(51) Int. Cl.
*H04L 29/06* (2006.01)

(52) U.S. Cl. .............................. 726/1; 707/694; 713/152

(58) Field of Classification Search .................. 713/152, 713/168–181; 726/1–3, 27, 30; 380/247–250; 707/694

See application file for complete search history.

(56) References Cited

U.S. PATENT DOCUMENTS

| | | | |
|---|---|---|---|
| 4,028,500 A | 6/1977 | McClure et al. |
| 5,410,602 A | 4/1995 | Finkelstein et al. |
| 5,457,748 A | 10/1995 | Bergum et al. |
| 5,666,530 A | 9/1997 | Clark et al. |
| 5,812,671 A | 9/1998 | Ross |
| 6,061,448 A | 5/2000 | Smith et al. |
| 6,073,237 A | 6/2000 | Ellison |
| 6,081,601 A | 6/2000 | Raivisto |
| 6,084,969 A | 7/2000 | Wright et al. |
| 6,085,323 A | 7/2000 | Shimizu et al. |
| 6,119,228 A | 9/2000 | Angelo et al. |
| 6,219,694 B1 * | 4/2001 | Lazaridis et al. ............. 709/206 |
| 6,229,894 B1 | 5/2001 | Van Oorschot et al. |
| 6,266,420 B1 | 7/2001 | Langford et al. |
| 6,289,105 B1 | 9/2001 | Murota |
| 6,640,301 B1 * | 10/2003 | Ng ................................ 713/156 |
| 6,661,927 B1 | 12/2003 | Suarez et al. |

(Continued)

FOREIGN PATENT DOCUMENTS

EP          0500245          8/1992

(Continued)

OTHER PUBLICATIONS

Stallings, W.: "SIMIME: E-mail Gets Secure". Byte, McGraw-Hill Inc., St. Peterborough, US, vol. 23, No. 7, Jul. 1998, pp. 41-42, XP000774260.

(Continued)

*Primary Examiner* — Hadi Armouche
(74) *Attorney, Agent, or Firm* — Jenna L. Wilson; Dimock Stratton LLP (57) ABSTRACT

A system and method for handling secure-format messages includes a message server that receives secure-format messages from senders and operates in conjunction with a secure message handler to detect and prevent the delivery of invalid secure-format messages. When a secure-format message is determined to be invalid, the secure message handler may take one or more of the following actions: replace the body of the invalid message with a template message, send a message to the sender of the invalid message indicating the message was rejected, delete the invalid message from the recipient's mailbox, or log the message on the message server and mark it for review. Additionally, the handling of invalid messages is configurable. In particular, the actions to take and the conditions under which those actions are to be taken may be specified by an administrator.

15 Claims, 4 Drawing Sheets

U.S. PATENT DOCUMENTS

| | | |
|---|---|---|
| 6,779,115 B1 | 8/2004 | Naim |
| 6,829,357 B1 | 12/2004 | Alrabady et al. |
| 6,904,521 B1 | 6/2005 | Jivsov |
| 6,918,038 B1 | 7/2005 | Smith et al. |
| 6,925,568 B1 | 8/2005 | Heinonen |
| 6,983,367 B2 | 1/2006 | Go et al. |
| 6,993,137 B2 | 1/2006 | Fransdonk |
| 7,020,708 B2 | 3/2006 | Nelson et al. |
| 7,113,927 B1 | 9/2006 | Tanaka et al. |
| 7,127,604 B2 | 10/2006 | Lide et al. |
| 7,171,552 B1 | 1/2007 | Bell |
| 7,228,418 B1 | 6/2007 | Girault |
| 7,254,712 B2 | 8/2007 | Godfrey et al. |
| 7,529,374 B2 | 5/2009 | Huttunen |
| 2001/0046307 A1 | 11/2001 | Wong |
| 2002/0007453 A1 | 1/2002 | Nemovicher |
| 2002/0032861 A1 | 3/2002 | Azuma |
| 2002/0035687 A1 | 3/2002 | Skantze |
| 2002/0059383 A1 | 5/2002 | Katsuda |
| 2002/0199120 A1* | 12/2002 | Schmidt ............... 713/201 |
| 2003/0172122 A1 | 9/2003 | Little et al. |
| 2003/0196098 A1* | 10/2003 | Dickinson et al. ........ 713/188 |
| 2003/0198350 A1 | 10/2003 | Foster et al. |
| 2004/0073617 A1* | 4/2004 | Milliken et al. .......... 709/206 |
| 2004/0083364 A1 | 4/2004 | Andreaux et al. |
| 2004/0249892 A1 | 12/2004 | Barriga et al. |
| 2005/0114671 A1 | 5/2005 | Little et al. |
| 2005/0163320 A1 | 7/2005 | Brown et al. |
| 2005/0188219 A1 | 8/2005 | Annicet et al. |
| 2005/0210289 A1 | 9/2005 | Brown |
| 2005/0246763 A1 | 11/2005 | Corcoran et al. |
| 2006/0036865 A1 | 2/2006 | Brown et al. |
| 2006/0101334 A1* | 5/2006 | Liao et al. ................. 715/523 |
| 2007/0118874 A1 | 5/2007 | Adams et al. |
| 2007/0123307 A1 | 5/2007 | Adams et al. |
| 2007/0165844 A1 | 7/2007 | Little et al. |

FOREIGN PATENT DOCUMENTS

| | | |
|---|---|---|
| EP | 0841770 A | 5/1998 |
| EP | 1096725 A2 | 5/2001 |
| EP | 1096727 A2 | 5/2001 |
| EP | 1580953 | 9/2005 |
| EP | 1806683 | 7/2007 |
| JP | 7-509333 | 10/1995 |
| JP | 8-251221 | 9/1996 |
| JP | 10-022992 | 1/1998 |
| KR | 1020030059303 | 7/2003 |
| WO | 96/36934 A1 | 11/1996 |
| WO | 97/41661 A | 11/1997 |
| WO | 98/34374 A | 8/1998 |
| WO | 99/05814 | 2/1999 |
| WO | 99/06900 | 2/1999 |
| WO | WO 99/05814 A | 2/1999 |
| WO | 99/27678 A2 | 6/1999 |
| WO | 00/69114 A | 11/2000 |
| WO | 00/72506 A1 | 11/2000 |
| WO | 01/24434 A | 4/2001 |
| WO | 01/78491 A2 | 10/2001 |
| WO | 03/005636 | 1/2003 |

OTHER PUBLICATIONS

Crocker S. et al.: MIME Object Security Services; rfc1848.textM. IETF Standard, Internet Engineering Task Force, IETF, CHI Oct. 1995, XP015007633.

Katsuro Inaya, et al., "Use Windows CE Now", ASCII, Oct. 1, 1999, vol. 23, No. 10, pp. 266-285.

Hiroyuki Sawano, Create a Secure Electronic Mail Environment with SIMIME, @IT Security & Trust, May 30, 2001, URL: http://www.atmarkit.co.jp/fsecurity/special/O4smime/smimeOI.html.

Blom et al. "Conversational IP Multimedia Security", 4th International Workshop on Mobile and Wireless Communications Network, Sep. 1, 2002, pp. 147-151.

Fumy et at. Principles of Key Management, IEEE Journal on Selected Areas in Communications, VDI, 11, No. 5, Jun. 1999, pp. 785-793.

Eskicioglu et at. "A Key Transport Protocol Based on Secret Sharing Applications to Information Security", IEEE Transactions on Consumer Electronics, vol. 46, No. 4, Nov. 2002, pp. 816-824.

Kotzanikoloau et al. "Hybrid Key Establishment for Multiphase Self-organized Sensor Networks", 6" IEEE International Symposium on a World of Wireless Mobile and Multimedia Networks, Jun. 13-16, 2005, pp. 581-587.

Research in Motion Limited, Blackberry Security White Paper Release 4.0. 2005 Internet Address: http://blackberry.comIknowledgecenterpubliclivelink.exe?func=ll&objld=S2SO44&objAction=browse&sort=name.

Policht, Martin, Sal Server 2005 Security—Part 3 Encryption, Database Journal Internet Address: http://www.databasejournal.com/features/mssql/article.php/34S3931.

Encrypt Pre-shared Keys in Cisco 10s Router Configuration Example, Document 1 D 46420 Cisco Systems, Internet Address: htto:/lwww.cisco.com/en/US/tech/tk5S3/tk3721t echnologies~configuration~example09186a008f021336.shtml.

Kiely, Don, Sal Server 2005 Secures Your Data Like Never Before, Sep. 29, 2005. Internet Address: http://www.devx.comIcodemagIArticle/29351?trk=DXESS DB.

Dusse Etal.: "SIMIME Version 2 Certificate Handling," Database IETF RFC Online IETF; RFC 2312, 0311998, pp. 1-20 (Chapter 2.1, Chapter 4.1), XP002220385.

Hoffman: "Enhanced Services for SIMIME," Database IETF RFC Online IETF; RFC 2634, 0611999, pp. 1-58 (Chapter 3, pp. 24-32), XP002220386.

Schumacher: "AutoPGP FAQ, Version 1 ," Internet Newsgroup, 'Online! (Apr. 19, 1994), XP002230742.

Levien: "Protecting Internet E-Mail From Prying Eyes," Data Communications, McGraw Hill, New York, US, vol. 25, No. 6 (May 1, 1996), pp. 117-118, 120, 122, XP 000587586.

Syverson: "Limitations on Design Principles for Public Key Protocols," Security and Privacy, 1996, Proceedings, 1996 IEEE Symposium on Oakland, CA, USA, May 6-8, 1996, Los Alamitos, CA, USA, IEEE Comput. Soc., US, May 6, 1996, pp. 62-72, XP010164926.

Gong et al.: "Multicast Security and its Extension to a Mobile Environment," SRI International, Computer Science Laboratory, J.C. Baltzer AG, Science Publishers, Wireless Networks 1 (1995) pp. 281-295.

Lai, M.K.E., et al.: "A Mobile Subscriber Proxy Preserving Writer-to-Reader Message Security," Military Communications Conference, 1996, Milcolm '96, Conference Proceedings, IEEE McLean, VA, USA, Oct. 21-24, 1996, New York, NY, USA, IEEE, US, Oct. 21, 1996, pp. 461-467, XP010203896.

Cole, R., et al.: "An Architecture for a Mobile OSI Mail Access System," IEEE Journal on Selected Areas in Communications, IEEE Inc., New York, US, vol. 7, No. 2, Feb. 1989, pp. 249-256, XP000904914.

Harris, A.: "Content Privacy and Content Security Working Together," Internet Article, Content Technologies White Paper, 'Online! Sep. 1999, pp. 8-9, XP002223158.

Torvinen, V.: "Wireless PKI: Fundamentals," Internet Article, Radicchio White Paper, 'Online! 2000, pp. 12-13, XP002223159.

Mambo, M., et al.: "Proxy Signatures: Delegation of the Power to Sign Messages," IEICE Transactions on Fundamentals of Electronics, Communications and Computer Sciences, IEICE Tokyo, JP, vol. E79-A, No. 9, Sep. 1, 1996, pp. 1338-1353, XP000679624.

Brown, M., et al.: "PGP in Constrained Wireless Devices," Proceedings of the 9th Usenix Security Symposium, Denver, CO, Aug. 14-17, 2000, XP002210575.

Brown, I., et al.: "A Proxy Approach to E-Mail Security," Software Practice & Experience, John Wiley & Sons Ltd., Chichester, GB, vol. 29, No. 12, Oct. 1999, pp. 1049-1060, XP000852351.

Sybramanyam, V., et al.: "Security in mobile systems," Reliable Distributed Systems, 1998 Proceedings, 17th IEEE Symposium on W. Lafayette, IN, USA, Oct. 20-23, 1998, Los Alamitos, CA, USA, IEEE Comput. Soc., US, Oct. 20, 1998, pp. 407-412, XP010319125.

* cited by examiner

SYSTEM AND METHOD FOR HANDLING ELECTRONIC MESSAGES

FIELD OF THE INVENTION

The present invention relates generally to the field of communications and more specifically to a system and method for handling encrypted or digitally signed electronic messages.

BACKGROUND OF THE INVENTION

Security has become increasingly important in communication systems. In communication systems with inadequate security, messages can potentially be intercepted, read by unintended recipients, tampered with, and then forwarded on to original recipient as if the message was sent directly from the original sender. Accordingly, message security must be robust to ensure that parties are who they claim to be, to protect the confidentiality of sensitive information, and to prevent tampering with the data. In one approach to providing security, electronic messages may be encrypted by a sender and decrypted by a recipient using a public/private key mechanism. Another approach is for a sender to digitally sign messages.

One protocol for providing for digital signatures and encryption in massaging systems is S/MIME (Secure Multipurpose Internet Mail Extensions). S/MIME allows a sender to digitally sign messages using a private key, encrypt messages with a recipient's public key, or both digitally sign and encrypt the message. When a signed message arrives at a recipient's message server that supports S/MIME, its message signature is verified. A failing signature indicates that the message may have been tampered with. Thus, if the message signature does not verify correctly, the message is invalid. A message will also be invalid if it is signed with a key having a matching certificate that is weak, revoked, untrusted or expired. Similarly, a message encrypted with a recipient's public key (typically made available to the sender in a security certificate associated with the recipient) is able to be decrypted by the recipient who uses the matching private key.

Typically, in existing electronic communications systems, when an S/MIME message is determined to be invalid it is delivered to the intended recipient with an accompanying notification that the message is invalid. The intended recipient is put on notice that the message is not a valid, secure message. However, delivering such an invalid message to the recipient is often not a prudent course of action. Many massaging system users routinely disregard such warnings and open the message. In security conscious organizations, it is beneficial that message recipients do not have the opportunity to ignore such security warnings. It is therefore desirable to have a system and method for handling invalid messages prior to the recipient having a chance to view the message.

BRIEF DESCRIPTION OF THE DRAWINGS

In drawings which illustrate by way of example only a preferred embodiment of the invention.

DETAILED DESCRIPTION OF THE INVENTION

The systems and methods of the present invention provide for improved message handling in a communication system.

According to one aspect of the invention, there is provided a system and method in which a program running at a host system verifies the message signature of an incoming message and, if the message is invalid, removes the body of the invalid message and replaces it with a template message prior to forwarding the message to a mobile communications device.

According to another aspect of the invention, there is provided a system and method in which a program running at a host system verifies the message signature of an incoming message and, if the message is invalid, sends a message back to the sender of an invalid message indicating the message was rejected by the recipient's firewall.

According to another aspect of the invention, there is provided a system and method in which a program running at a host system verifies the message signature of an incoming message and, if the message is invalid, deletes the invalid message from the recipient's mailbox.

According to another aspect of the invention, there is provided a system and method in which a program running at a host system verifies the message signature of an incoming message and, if the message is invalid, logs the invalid message and marks it for review.

According to another aspect of the invention, there is provided a system and method in which the handling of electronic messages through a host system to a mobile communications device is configurable. The configuration may include specifying the actions that programs running at the host system will take and the conditions under which a specified action will be taken.

According to another aspect of the invention, there is provided a computer-implemented method for handling a secure-format electronic message to be sent from a sender to a recipient mobile communication device through a host system, the method including the steps of defining a set of secure message policies accessible at the host system, the secure message policies including message characteristic criteria, receiving the secure-format message at the host system, comparing the secure-format message with the message characteristic criteria in the set of secure message policies to determine the validity of the secure-format message at the host system, and selectively forwarding the secure-format message from the host system to the mobile communication device based on the determined validity of the secure-format message.

According to another aspect of the invention, there is provided the above method in which secure-format message is an S/MIME format electronic mail message, in which the message characteristic criteria of the secure message policies comprise the characteristic of a valid digital signature, and in which the step of determining the validity of the secure-format message includes the step of determining if the secure-format message has a valid digital signature.

According to another aspect of the invention, there is provided the above method in which the secure-format message is an encrypted electronic mail message, in which the message characteristic criteria of the secure message policies comprise the characteristic of a valid security certificate, and in which the step of determining the validity of the secure-format message includes the step of determining if the key used to encrypt the secure-format message has a matching certificate that is valid.

According to another aspect of the invention, there is provided the above method in which the step of defining the set of secure message policies further includes the step of defining a set of message delivery options and in which the method further includes the step of carrying out message delivery in accordance with the defined set of message delivery options.

According to another aspect of the invention, there is provided the above method further including the step of selectively forwarding a notification message to the sender, based on the message delivery options and on the comparison of the received message with the message characteristic criteria of the secure message policies.

According to another aspect of the invention, there is provided the above method in which the step of defining the set of secure message policies further includes the step of defining a set of notification templates and in which the method further includes the step of selectively delivering a notification message to the mobile communication device, the notification message incorporating one or more of the defined set of notification templates and the selective delivery being based on the comparison of the received message with the message characteristic criteria of the secure message policies.

According to another aspect of the invention, there is provided the above method in which the step of selectively delivering a notification message to the mobile communication device further includes the step of digitally signing the notification message to permit message authentication at the mobile communication device.

According to another aspect of the invention, there is provided a computer program product for handling electronic messages, the computer program product including a computer-useable medium have in computer-readable program product code embodied in the medium, the program code being executable by one or more processors for implementing the methods described above.

According to another aspect of the invention, there is provided a computer program product for handling electronic messages, the computer program product including a computer-useable medium have in computer-readable program product code embodied in the medium, the program code being executable at a host system for receiving electronic messages and for selectively forwarding electronic messages to a mobile communications device, the program code including:

code operable to define an administrator-configurable set of secure message policies accessible at the host system, the secure message policies including message characteristic criteria, code operable at the host system for comparing a received secure-format message with the message characteristic criteria in the set of secure message policies to determine the validity of the received secure-format message, and code operable to selectively initiate the forwarding of the received secure-format message to the mobile communications device based on the determined validity of the secure-format message.

According to another aspect of the invention, there is provided the above computer program product in which the host system includes redirection program code for redirecting the received secure-format messages to the mobile communications device, the code operable for comparing a received secure-format message with the message characteristic criteria and the code operable to selectively initiate forwarding of the received secure-format message both being integral with the redirection program code.

According to another aspect of the invention, there is provided the above computer program product in which the code operable to define an administrator-configurable set of secure message policies, further includes program code for defining an administrator-configurable set of message delivery options, and in which the code operable to selectively initiate forwarding of the received secure-format message further includes code operable to selectively forward notification messages, based on the defined set of message delivery options.

According to another aspect of the invention, there is provided the above computer program product in which the code operable to define an administrator-configurable set of secure message policies, further includes program code for defining an administrator-configurable set of message delivery options, and in which the code operable to selectively initiate forwarding of the received secure-format message further includes code operable to selectively forward a notification message to the mobile communications device and to digitally sign the notification message to permit authentication of the notification message at the mobile communications device.

The present invention thus permits a host system to make handling steps for electronic messages having invalid signatures or other electronic message characteristic criteria. An invalid message is able to be handled prior to a message recipient having the opportunity to read the message in violation of an organization's security policy.

Figure 1:
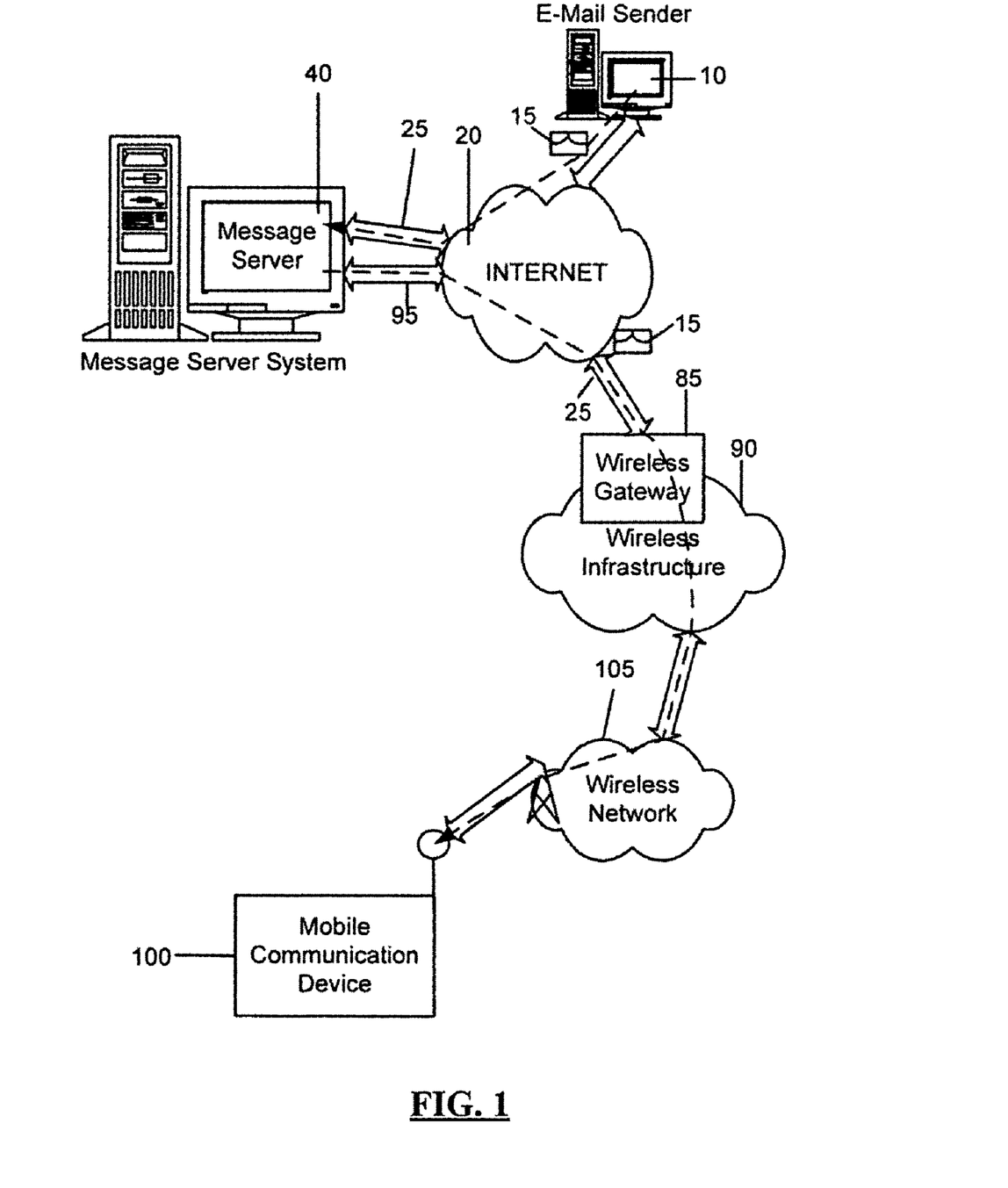
FIG. 1 is an overview of an example communication system in which a mobile communication device may be used for messages delivered in accordance with the preferred embodiment.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common programs for use as message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks users as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 may be sent by the e-mail sender system 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
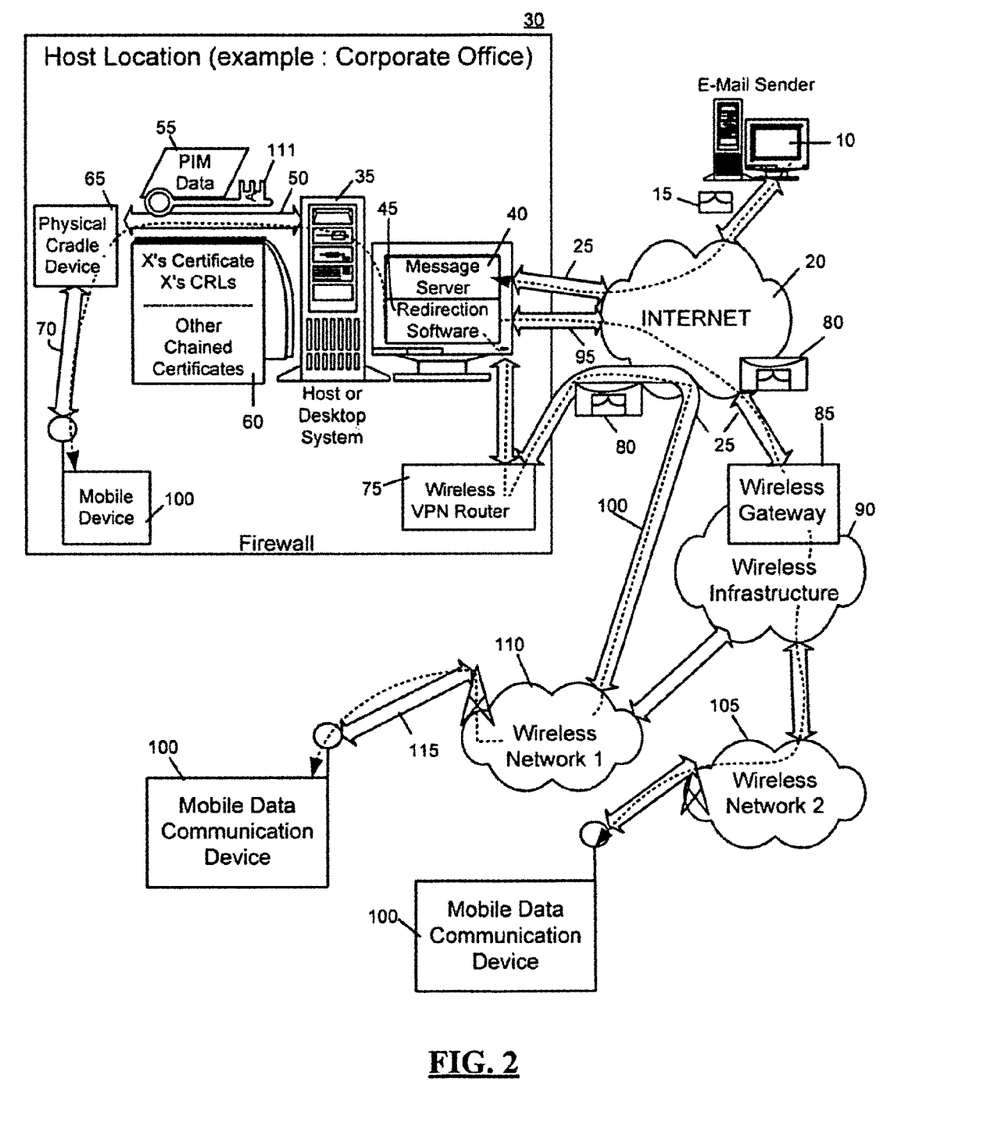
FIG. 2 is a block diagram of a further example communication system including multiple networks and multiple mobile communication devices for messages delivered in accordance with the preferred embodiment.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, shown running on a computer within the firewall of the host system 30, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 implies that a VPN connection is established directly through a specific wireless network 110 to a mobile device 100. In the example of FIG. 2, wireless VPN router 75 is intended to use Internet Protocol (IP) Version 6 (IPV6) for IP-based wireless networks. This new protocol provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol. (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

S/MIME is a message security protocol that enables end-to-end authorization and protection of data integrity and privacy from the time that the originator sends the message until the message recipient decodes and reads the message. S/MIME allows a message sender to digitally sign a message using a private key, encrypt a message with a recipient's public key, or both digitally sign and encrypt the message. When a signed message arrives at a recipient's message server that supports S/MIME, the server will typically attempt to verify the signature of the received message. A failing signature indicates that the message may have been tampered with. Thus, if the message signature does not verify correctly, the message is declared to be invalid. A message may also be declared to be invalid by a message server if it is signed with a key having a matching certificate that is weak, revoked, untrusted or expired.

Similarly, a secure message that is encrypted with a public key that has a matching certificate that is weak, revoked, untrusted or expired may be declared to be an invalid secure message. In such a case, although the recipient may be able to decrypt the received message the security of the encrypted message will be unreliable due to the status of the certificate in question. This type of message is declared to be an invalid secure message because at the time of delivery the certificate associated with the encryption of the message is deficient and therefore the recipient lacks assurance that the message has been validly encrypted.

Even in the case when a secure message is invalid, however, the message itself remains capable of being delivered to its intended recipient. Often message servers will, in fact, make an S/MIME message with an invalid signature available to its intended recipient. Similarly, a message that is encrypted with a key that has a matching certificate that is weak, revoked, untrusted or expired (an invalid encrypted message) is deliverable to the intended recipient by the message server.

Figure 3:
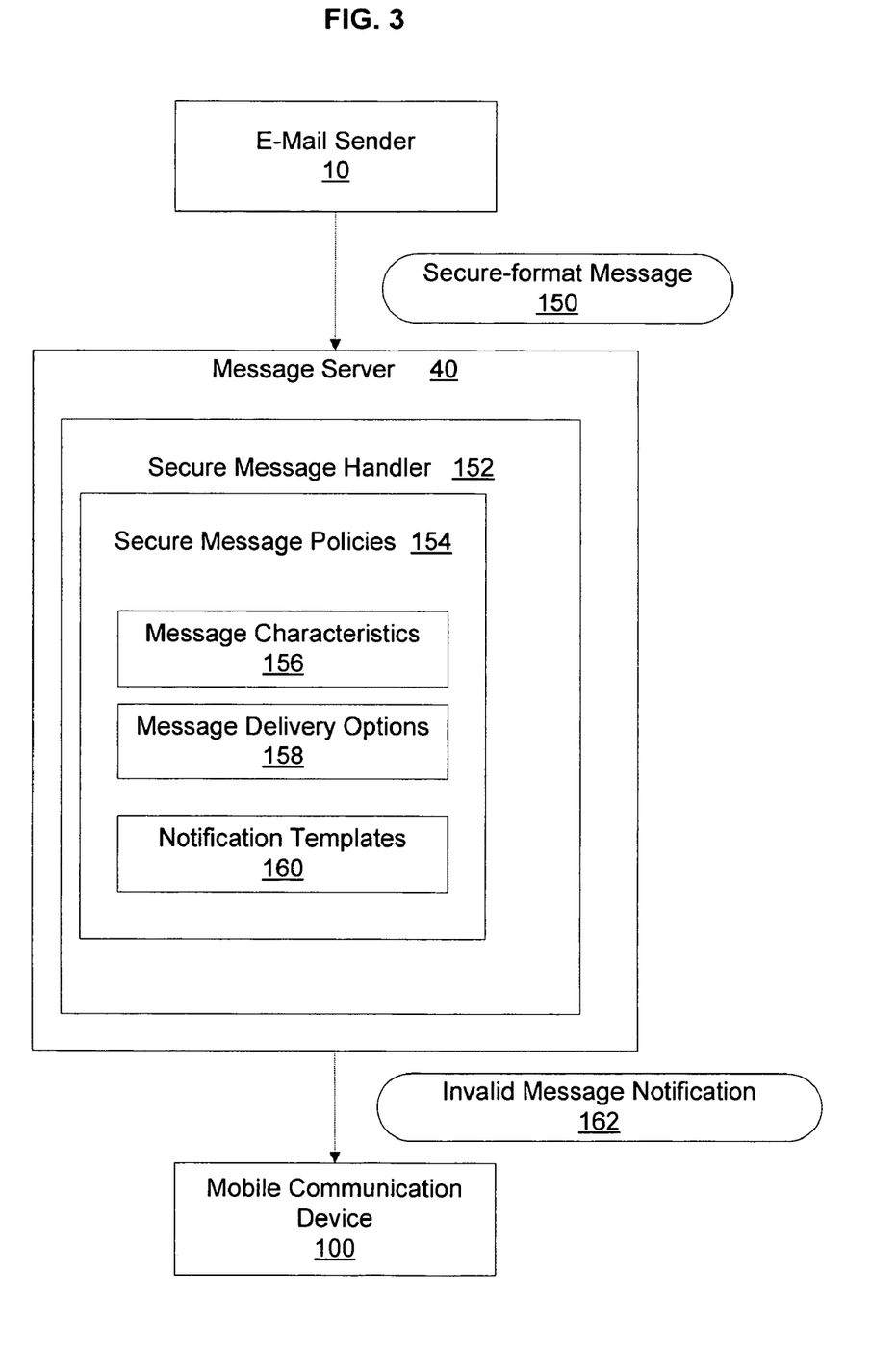
FIG. 3 is a block diagram showing a schematic representation of message handling in accordance with the preferred embodiment.

In contrast, the architecture of the preferred embodiment permits host system 30 to restrict availability of invalidly signed S/MIME messages and invalidly encrypted messages to recipients. The mechanism for restricting the delivery of such invalid messages is defined in redirection program 45 of the preferred embodiment. FIG. 3 is a block diagram showing a high-level schematic representation of secure-format message handling in accordance with the preferred embodiment. As shown in FIG. 2, message server 40 operates in conjunction with redirection software 45. In the preferred embodiment, to handle secure-format message 150, redirection software 45 further includes software code referred to as secure message handler 152. It will be appreciated that other implementations may be developed in which secure message handler 152 is not part of redirection software 45, as long as the functionality of secure message handler 152 is available to operate in conjunction with message server 40. For example, secure message handler 152 may be included directly within message server 40 and operate as part of that message server component of the system at host system 30. Such an arrangement may be found were there is no redirection program 45 or may be found where message server 40 includes functionality for advanced handling of electronic messages. For example, the system shown in FIG. 1 does not include a redirection program component. In such an arrangement, message server 40 is itself a host system and secure message handler 152 functionality may be included as an integral part of message server 40 as shown in FIG. 1.

Alternatively, secure message handler 152 may be implemented as separately executable computer program code which is able to be invoked from message server 40 at a host system, such as host system 30 in FIG. 2, without first invoking redirection program 45. Other arrangements of secure message handler with message server 40 are also possible.

In the preferred embodiment, secure message handler 152 is executable to define a set of secure message policies 154. In the preferred embodiment, secure message policies define identification, manipulation and delivery options for invalid secure messages. Secure message handler 152 includes computer program code executable to allow a network administrator to define secure message policies 154. Secure message handler 152 of the preferred embodiment allows the network administrator to define message characteristics 156 which comprise the criteria for declaring that a received secure-format message is invalid.

According to the preferred embodiment, such secure message policies are defined and stored as a result of administrator use of redirection program 45. A user with administrator privileges is able to use redirection program 45 to set up desired secure message policies 154. In the preferred embodiment, secure message policies 154 include data records stored in a database accessible by redirection program 45. As will be appreciated by those skilled in the art, an administrator may define secure message policies 154 by using other executable code operative to carry out the functions described.

In the preferred embodiment, an administrator will use an interface generated by redirection program 152, secure message handler 154 or a program defined to manage the administrator function. The administrator will be provided with different options that will, upon selection by the administrator, result in defined values being stored by secure message handler 152 in one or more records found stored in a database, a configuration file, or a similar data construct. Secure message policies 154 include, as shown in FIG. 3, message characteristics 156, message delivery options 158, and notification templates 160. Each of these types of secure message policies 154 is definable by an administrator.

As set out above, in the preferred embodiment a secure-format message may be declared invalid if the message has a failed signature or if the message is properly signed but the certificate corresponding to the signature has expired or is otherwise deficient. Further, a secure message may be declared invalid if it was encrypted by a key for which the matching certificate has expired or is otherwise deficient. In the preferred embodiment, the default set of secure message policies 154 include message characteristic criteria defined so as to result in such a message being declared invalid. Secure message handler 152 of the preferred embodiment also includes computer code executable to permit the network administrator to optionally define received messages as invalid in other circumstances. In particular, where message server 40 is unable to access information to determine the status of the public key associated with the certificate or is missing the root certificate, message server 40 cannot determine the trustworthiness of the message. The preferred embodiment provides the network administrator with the option of defining the set of secure message policies 154 to treat such messages either as valid or as invalid messages. Accordingly, the degree of security may be controlled through the definition of message characteristics 156 in secure message policies 154. This configurable determination of secure message policies 154 allows host system 30, in spite of potential security concerns, to be used to send certain types of received messages to certain recipients, whereas other types of received messages with other message characteristics will not be forwarded.

Secure message handler 152 of the preferred embodiment further provides computer code executable to access the stored set of secure message policies 154 to determine which actions to take for a given received message. This is determined by reference to message delivery options 158 in the preferred embodiment. In the preferred embodiment, a network administrator may configure message delivery options 158 using secure message handler 152. As is described in more detail below, notification templates 160 may be defined for generating invalid message notification 162 which is delivered to mobile communication device 100 in the depiction of FIG. 3.

Figure 4:
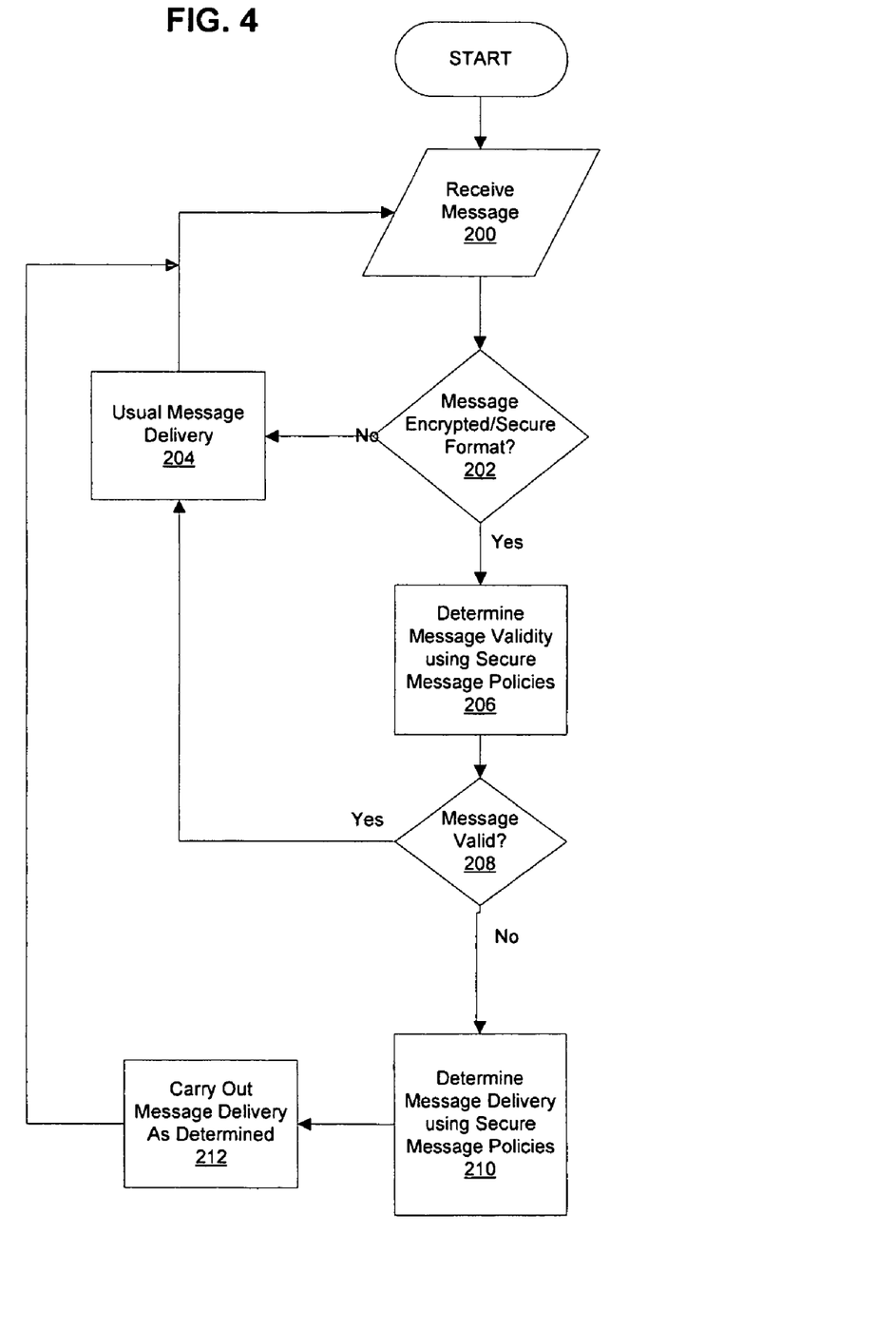
FIG. 4 is a flow chart showing the handling of messages using secure message policies according to the preferred embodiment.

FIG. 4 is a flow chart showing the secure-format message handling in accordance with the preferred embodiment. When, at host system 30, message server 40 receives incoming messages (box 200 in FIG. 4) determination is made as to whether the message is in secure format (decision branch 202 in FIG. 4). If the message is not in a secure format and not encrypted, the message is delivered through host system 30 using the usual host system 30 mechanism (box 204). For secure-format message 150 received by message server 40, secure message handler 152 is invoked to determine whether secure-format message 150 is valid according to message characteristics 156 specified in secure message policies 154 (process box 206). If secure-format message 150 is verified to be valid (decision box 208), the usual message delivery process continues and the message is forwarded to the recipient (box 204). In FIG. 3, the recipient is shown as mobile communication device 100.

When a message is determined to be invalid (at steps 206, 208) secure message handler 152 executes to take one or more actions according to the procedures specified in message delivery options 158 in secure message policies 154 (box 210). In the preferred embodiment, the potential actions include secure message handler 152 executing to replace the body of the invalid message with one of notification templates 160 to form invalid message notification 162, sending a message to the sender of the invalid message indicating that the message was rejected, deleting the invalid message from the recipient's mailbox at host system 30, or logging the message on the message server 40 and marking it for review by the network administrator. It is possible for secure message handler 152 to carry out more than one of these potential actions in response to detection of a single invalid message. In the preferred embodiment it is contemplated that there will be default values provided for secure message policies 154 and therefore if secure message policies 154 are not configured by the network administrator, the default values for secure message policies 154 will be accessed by secure message handler 152.

If message delivery options 158 in secure message policies 154 specify replacing the message body of an invalid message with one of the notification templates 160, the message body of the invalid message is deleted by secure message handler 152 and the template message specified in message delivery options 158 (potentially a default defined message) is inserted into the message body of the invalid received message and the result is sent to the recipient as invalid message notification 162.

The template message may be tailored to indicate the reason that the message was found invalid. For example, a template message could read: "It has been detected that this message violates a security constraint of the system because [insert reason here]." In the preferred embodiment, redirection program 45 executes to digitally sign the replacement message that is forwarded to the recipient in place of the invalid message. In this way the recipient mobile communications device will be able to determine whether the notification message sent from the host system is authentic. Secure message policies 154 may be defined such that a notification message is created by a template message replacing the message body for the received message. Further, if secure message policies 154 are configured by an administrator in an appropriate manner (or the system is defined with appropriate default values) the template message will, in certain circumstances, replace the message body of the invalid message at the recipient's mailbox at the host system. As a result this would replace the message body of the message received at the recipient's desktop computer 35 as well as at mobile device 100.

If message delivery options 158 in secure message policies 154 specify sending a notification to message sender system 10, a newly defined message is generated by secure message handler 152 and is sent to sender system 10, the device responsible for sending the invalid message (represented in FIG. 4 as one of the potential steps carried out at box 212). The message sent to the sender is defined according to a template message defined in notification templates 160. For example, a default for the template message could read: "Your message could not be delivered as it was rejected by the recipient's firewall." The network administrator, using secure message handler 152 of the preferred embodiment, may optionally define the message to be different from the default message. For example, the computer code of secure message handler 152 is executable to store the reason for secure-format message 150 being declared invalid. In the preferred embodiment, secure message handler 152 permits the template message to be tailored to indicate to the sender the reason that secure-format message 150 was found invalid. As will be appreciated, network administrators for different mail systems will have varying requirements for providing such notification to senders of invalid messages. In some contexts it will be important to provide as much information as possible to the senders while in other contexts the desirable course of action is to provide no such information to such senders. Configurable secure message policies 154 provided by secure message handler 152 of the preferred embodiment permit such context-dependent choices to be made by network administrators.

Returning now to the different actions definable by secure message policies 152, if the secure message policies specify deleting a received invalid message, then the invalid message is deleted from the recipient's mailbox entirely. This option prevents the recipient from viewing the message on their messaging device 100 or desktop computer 35. In conjunction with such a choice, or independently, if secure message policies 154 specify a log and mark operation, the invalid message is logged at message server 40 by secure message handler 152 and marked for review by the network administrator.

As is set out above, the preferred embodiment provides for a configurable means for controlling the delivery of invalid messages to recipients. As defined by the default settings, or as configured by a network administrator, secure message policies 154 are accessed by secure message handler 152 to determine what actions are to be taken for received secure messages. This permits an electronic messaging system to provide context-appropriate responses to received secure-format messages for the system users.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A method for handling secure-format electronic messages, the method comprising:
 receiving a secure-format electronic message at a host system associated with a recipient mobile communication device;
 when configured secure message policies are stored at the host system, comparing the secure-format electronic message with invalid message criteria comprised in the configured secure message policies to determine whether the secure-format electronic message is invalid;
 when no configured secure message policies are stored at the host system, comparing the secure-format electronic message with invalid message criteria comprised in default secure message policies to determine whether the secure-format electronic message is invalid;
 when the secure-format electronic message is determined to be invalid, implementing a message delivery option at the host system to prevent transmission of the received secure-format electronic message to the recipient mobile communication device, the message delivery option including sending to the recipient mobile communication device an invalid message notification in place of the secure-format electronic message, and none, one or more of:
  marking the secure-format electronic message for review at the host system; and
  deleting the secure-format electronic message from a mailbox at the host system associated with the recipient mobile communication device.

2. The method of claim 1, wherein the secure-format electronic message comprises a digital signature or an encrypted message, and the invalid message criteria comprises a certificate corresponding to the digital signature or encrypted message having expired.

3. The method of claim 1, wherein the invalid message notification comprises a selected one or more of the notification templates from a set of notification templates.

4. The method of claim 1, further comprising the host system digitally signing the invalid message notification to permit authentication of said invalid message notification once received at the recipient mobile communication device.

5. A computer program product comprising a non-transitory computer-useable medium storing computer-readable code which, when executed by a processor of a computing device, causes said device to implement a method comprising:
 receiving a secure-format electronic message at a host system associated with a recipient mobile communication device;
 when configured secure message policies are stored at the host system, comparing the secure-format electronic message with invalid message criteria comprised in the configured secure message policies to determine whether the secure-format electronic message is invalid;
 when no configured secure message policies are stored at the host system, comparing the secure-format electronic message with invalid message criteria comprised in default secure message policies to determine whether the secure-format electronic message is invalid;
 when the secure-format electronic message is determined to be invalid, implementing a message delivery option at the host system to prevent transmission of the received secure-format electronic message to the recipient mobile communication device, the message delivery option including sending to the recipient mobile communication device an invalid message notification in place of the secure-format electronic message, and none, one or more of:
  marking the secure-format electronic message for review at the host system; and
  deleting the secure-format electronic message from a mailbox at the host system associated with the recipient mobile communication device.

6. The computer program product of claim 5, wherein the method further comprises the host system digitally signing the invalid message notification to permit authentication of said invalid message notification once received at the recipient mobile communication device.

7. A message server system associated with a recipient mobile communication device, the message server system comprising:

a processor executing a secure message handler configured to:

when configured secure message policies are stored at the message server system, compare a received secure-format electronic message with invalid message criteria comprised in the configured secure message policies to determine whether the secure-format electronic message is invalid;

when no configured secure message policies are stored at the message server system, compare the secure-format electronic message with invalid message criteria comprised in default secure message policies to determine whether the secure-format electronic message is invalid;

when the secure-format electronic message is determined to be invalid, implement a message delivery option at the message server system to prevent transmission of the received secure-format electronic message to the recipient mobile communication device, the message delivery option including sending to the recipient mobile communication device an invalid message notification in place of the secure-format electronic message, and none, one or more of:

marking the secure-format electronic message for review at the message server system; and         deleting the secure-format electronic message from a mailbox at the message server system associated with the recipient mobile communication device.

8. The message server system of claim 7, wherein the secure-format electronic message comprises a digital signature or an encrypted message, and the invalid message criteria comprises a certificate corresponding to the digital signature or encrypted message having expired.

9. The message server system of claim 7, wherein the message server system is further configured to digitally sign the invalid message notification to permit authentication of said invalid message notification once received at the recipient mobile communication device.

10. The method of claim 1, wherein the implemented message delivery option comprises both sending the invalid message notification and deleting the secure-format electronic message from the mailbox at the host system.

11. The method of claim 1, wherein the host system comprises a message server.

12. The computer program product of claim 5, wherein the implemented message delivery option comprises both sending the invalid message notification and deleting the secure-format electronic message from the mailbox at the host system.

13. The message server system of claim 7, wherein the implemented message delivery option comprises both sending the invalid message notification and deleting the secure-format electronic message from the mailbox at the message server system.

14. The method of claim 1, wherein the implemented message delivery option comprises both sending the invalid message notification and marking the secure-format electronic message for review at the host system.

15. The method of claim 1, wherein the message delivery option is comprised in the configured or default secure message policies.

* * * * *

UNITED STATES PATENT AND TRADEMARK OFFICE
CERTIFICATE OF CORRECTION

PATENT NO.        : 8,191,105 B2
APPLICATION NO.   : 11/281424
DATED             : May 29, 2012
INVENTOR(S)       : Neil P. Adams et al.

It is certified that error appears in the above-identified patent and that said Letters Patent is hereby corrected as shown below:

Column 1, line 27, delete "massaging" and insert therefor --messaging--; and
    Column 1, lines 48-49, delete "massaging" and insert therefor --messaging--.

Signed and Sealed this
Seventeenth Day of July, 2012

David J. Kappos
*Director of the United States Patent and Trademark Office*